(No Model.)
A. LEGO & H. DUPAU.
COUNTER FOR FACILITATING THE TRANSFER OF COIN.
No. 297,138. Patented Apr. 22, 1884.
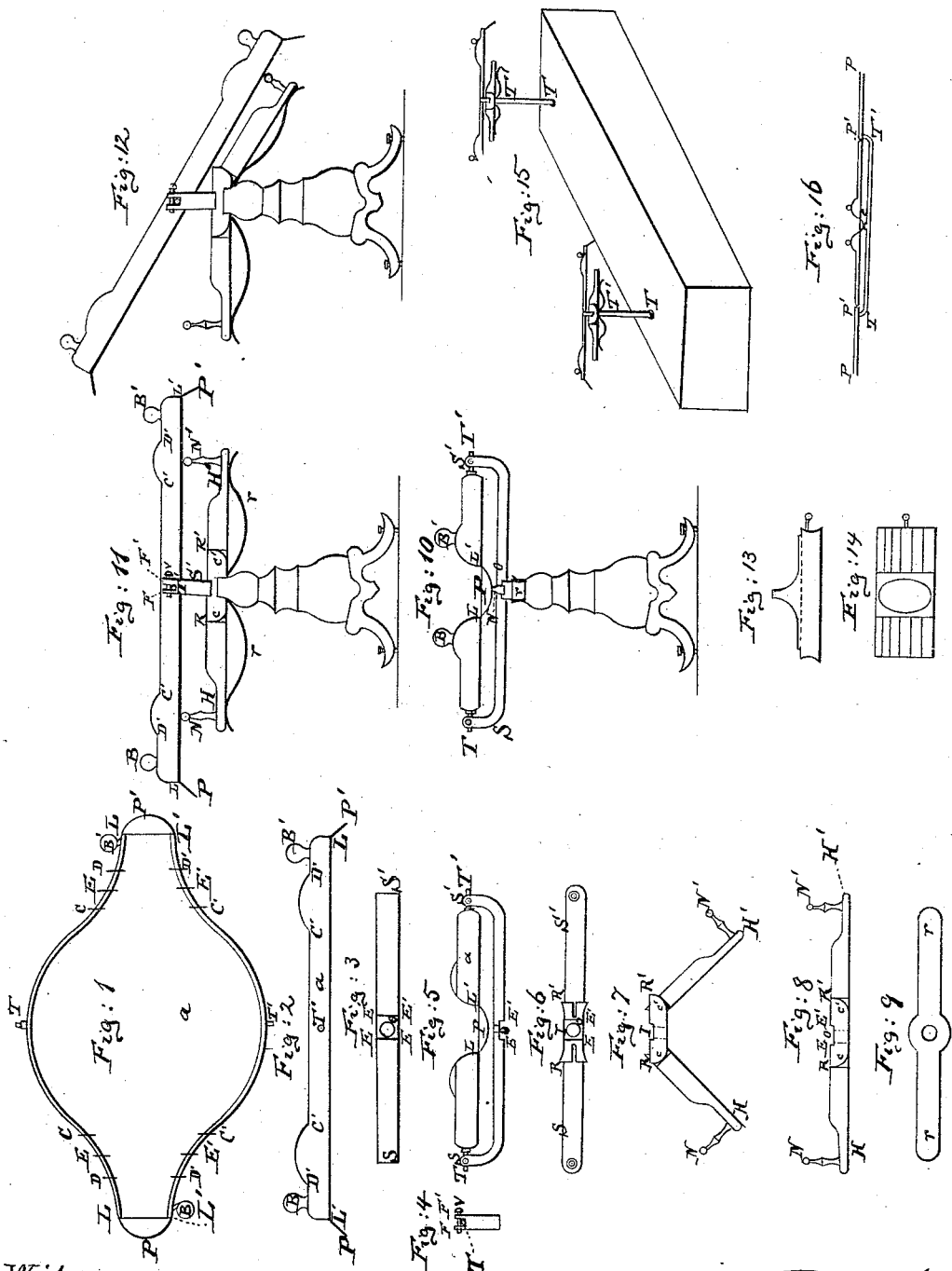
Witnesses:
John C. Tunbridge
Willy G. Schultz
Inventors
Albert Lego
Henri Dupau
by their attorneys
Briesen & Steele

UNITED STATES PATENT OFFICE.

ALBERT LEGO AND HENRI DUPAU, OF GRASSE, (ALPES-MARITIMES,) FRANCE.

COUNTER FOR FACILITATING THE TRANSFER OF COIN.

SPECIFICATION forming part of Letters Patent No. 297,138, dated April 22, 1884.

Application filed March 15, 1884. (No model.) Patented in France September 29, 1883, No. 157,758, and in Luxemburg February 4, 1884, No. 358.

*To all whom it may concern:*

Be it known that we, ALBERT LEGO and HENRI DUPAU, of the city of Grasse, (Alpes-Maritimes,) France, have invented a new, a useful, and Improved Apparatus for Facilitating the Transfer of Coin Between the Public and Cashiers at Bank-Counters and other Pay-Places, (for which we obtained Letters Patent in France for fifteen years, dated September 29, 1883, No. 157,758, and in Luxemburg for fifteen years, dated February 4, 1884, No. 358,) of which the following is a full, clear, and exact description.

This invention relates to an apparatus for facilitating the transfer of coin between the public and shop-keepers, bankers, cashiers, railway booking-clerks, and others requiring to pay over or receive sums of money in coin. By means of this apparatus relatively large amounts of coin, or amounts exceeding those of ordinary payments, may be delivered at a time, either into the hand, purse, or other receptacle.

In order that the invention may be more readily understood, we will proceed to describe the same with reference to the accompanying drawings, in which—

Figures 1 to 9 show the different parts of the apparatus separately, while Figs. 10 and 11 represent the apparatus complete and ready for use.

The apparatus comprises an oscillating chute P P', represented in plan and elevation in Figs. 1 and 2. It is composed of a flat copper plate or tray, *a*, of approximately-circular form, having a raised rim, slightly concaved, as in scale-pans; but the tray, instead of being a complete circle, is extended on either side, so as to form mouths E P E' for the delivery of the coin deposited thereon. The width of the mouths at E E' should be about four inches, (more or less,) gradually narrowed to just the necessary width at the outlet to allow of the largest coin passing through. Each mouth is provided with a downwardly-projecting lip, L P L'. The edge of the tray is slightly raised above the general level from C to D and from C' to D', and it is also provided with a knob, B B', at each end—one on either side of its longitudinal axis P P'—for operating the apparatus, as hereinafter described.

The tray is mounted on pivots T T', in a support, S O S', shown separately in Figs. 3, 4, and 5, and consisting of a bar bent upward at each end and terminating in a fork, F F', Fig. 4, to receive the pivots T T' of the tray. V is a screw passing through each of the forks F F', to secure the pivots therein when the tray is oscillated. The bar S O S' is screwed at its center, O, to the stem, foot, or other base of the apparatus, and it is notched at E O E', so as to fit on the cross-head to which the arms H H', Figs. 6, 7, 8, are hinged. This cross-head screws at its center, O, upon the pedestal of the apparatus, like bar S, and is also notched to receive said bar at E O E', the bar and cross-head being thus halved together. The arms H H' are hinged to the ends of the cross-head at R I R' in such manner as to allow of their being inclined in a downward direction, (see Fig. 7,) and of resuming a horizontal position, but they are prevented from rising above the horizontal. The downward movement of the limbs is limited by the curve *c c'*, Figs. 7 and 8. The former figure shows the arms inclined to the full extent required to enable the coins placed upon the tray to readily slide off it. At the end of each arm is fixed a pin, N N', upon which the ends of the tray *a* rest, the heads of said pins being incased in india-rubber to lessen the concussion.

The arms H H' are held up to the horizontal position by a spring, *r*, (represented in plan in Fig. 9,) whose two extremities press against the under side of the levers. This spring is a steel blade perforated at the middle for the passage of the central screw-stem, upon which the cross-head and the bar S O S' are screwed. Each half of the spring acts independently of the other, and moves upward or downward with its corresponding hinged arm, (see Fig. 12,) thus allowing of the oscillation of the chute in either direction.

The apparatus may be supported either upon a pillar, as in Figs. 10, 11, and 12, or on a pedestal or base, as in Fig. 13; but whichever kind be employed, a height of from five to six inches should always be left between the base and the point at which the spring *r r'* is placed, this being the minimum height necessary for the proper working of the apparatus.

The money to be paid away or received is counted out and deposited upon the tray, as on a counter, after which by simply pressing with one hand upon the knob B or B' the spring, which supports the tray in a horizontal position, cedes to the pressure and allows the tray to incline to that side, so as to cause the money deposited thereon to slide down and be delivered at the mouth E P E', Figs. 1 and 12, either into the other hand or into a purse, drawer, or other receptacle held under the mouth of the chute. The small lip L P L', Figs. 1 and 2, serves as a guide for the coins as they are discharged, and also for adjusting the mouth of the tray to the edge of the purse-mouth, and thus insures the delivery of the coins into the purse in a regular order. On releasing the knob the spring immediately raises the hinged arm, and with it the tray, to a horizontal position, where it remains until again oscillated, either on that or on the opposite side, and so on.

This apparatus may be employed in all shops, establishments, and places where money is required to be constantly handled.

The apparatus may be modified in form and dimensions according to circumstances, more especially with regard to the method of supporting it, and we will here describe three kinds of supports which are employed by preference.

First. A pillar-support—such as represented in Figs. 10, 11, and 12—for use in shops, refreshment-bars, and in other cases where room on the counter is an object.

Second. A base—such as that shown in Fig. 13—which is more especially intended for use in banks, pay-places, and railway-ticket offices. In this case the apparatus is mounted on a base, which may be placed in the window-opening, where the payments are made during the hours of business, and removed therefrom when not required. The base is also provided with a money-till, (see Fig. 14,) which, when the apparatus is in use, may be drawn out and placed under one end of the tray or chute, into a central cavity in which the money falls, and on either side of this cavity are provided separate compartments in which the several denominations of coins may be separately placed. This combined arrangement of chute and till is especially suited for the use of cashiers and at public and private pay-places.

Third. The chute may also be used without any support in shops and establishments having a special cashier's counter, and where it is preferred to have the apparatus on the same level as the counter. This arrangement would also be convenient for banks, public pay-places, and at railway-stations and other places.

Arranged in this way, the apparatus may be substituted with advantage for the brass plate usually let into these window-openings. In this case the oscillating chute would be inserted in an opening in the counter or ledge of the window, with its raised edges on a level with the counter or ledge beneath which are the different parts of the apparatus screwed on a stud, c, Fig. 16, carried upon an arm, T T', whose ends are bent up and solidly fixed to the counter P P'.

In applying the invention to scales or balances, the ordinary scale-pans are replaced by two chutes, and beneath these are mounted the different parts of the apparatus upon the two pillars T T', Fig. 15; or the balance may be provided with a chute at one end and an ordinary scale at the other, the whole being combined in such manner as to have an equal weight at each end, in order to insure the equilibrium of the balance. A balance of this kind would be of especial service in banks and public pay-places, where money is frequently required to be weighed, as, instead of requiring to handle the contents of the scale after weighing with an ordinary balance, the whole of the contents may, by simply pressing on the knob of the oscillating chute, be at once delivered into a bag or other receptacle, as before explained.

Fig. 15 shows the apparatus as adapted to what is known as a "Roberval balance;" but it may be applied to all other kinds of balances. In this special application, however, the oscillating chute should be made much larger and the edges be also higher than in ordinary applications.

We claim—

In an apparatus for facilitating the transfer of coin between the public and shop-keepers, bankers, cashiers, and any other persons, the arrangement of a flat tray of approximately-circular form, provided with mouths for the delivery of coin, the said tray resting upon a rod consisting of two parts pivoted on each side of the axis of the tray and supported by springs, in the manner hereinbefore shown and described.

The foregoing specification of our improved apparatus for facilitating the transfer of coin between the public and cashiers at bank-counters and other pay-places signed by us this 11th day of February, 1884.

ALBERT LEGO.
HENRI DUPAU.

Witnesses:
 THOMAS WILSON,
 A. CAUVIER.